F. L. STUART.
CONVEYER.
APPLICATION FILED FEB. 19, 1921.

1,403,921. Patented Jan. 17, 1922.

Inventor
Francis Lee Stuart
by his Attorneys
Baldwin & Wight

UNITED STATES PATENT OFFICE.

FRANCIS LEE STUART, OF NEW YORK, N. Y.

CONVEYER.

1,403,921.

Specification of Letters Patent.  Patented Jan. 17, 1922.

Application filed February 19, 1921. Serial No. 446,404.

*To all whom it may concern:*

Be it known that I, FRANCIS LEE STUART, a citizen of the United States, residing in New York, county of New York, and State of New York, have invented certain new and useful Improvements in Conveyers, of which the following is a specification.

This invention relates to conveyers of the kind where provision is made for carrying material by means of conveyer belts from a source of supply to apparatus which delivers material to storage piles, bins, barges, cars or other carriers. Some conveyer systems of this class comprise a main conveyer belt extending from a source of supply toward the place of delivery and formed with a loop or tripper from which the material is discharged on to an endless conveyer belt or similar conveyer mounted in an elevated structure or tower which can be moved from place to place over the main conveyer belt so that the conveyer carried by the tower may be made to deliver to a vessel or other carrier located anywhere on either side of the main conveyer.

My invention relates to this class of conveyers and according to my invention I employ a plurality of main conveyer belts arranged side by side and which may receive material from the same or from different sources of supply and I associate with these belts a plurality of towers provided with conveyers, any one of which can receive material from any one or from all of the main conveyer belts. The conveyer on one tower can receive material from one of the belts and the conveyer on another tower can receive material from another belt. It is sometimes desirable to shift the delivery loop or tripper of a main conveyer belt from one tower to another and in order to do this I support the tripper on a truck which may be moved back and forth over the main conveyer belt through the towers and below the plane of the delivery conveyers carried by the towers. The delivery loops or tripper portions of the main conveyer belts are each carried by a frame pivoted to a truck and means is provided for raising and lowering the frame in such manner that the loop or tripper may be lowered to a horizontal position so as to pass through a tower or may be raised to a position which will cause it to deliver to the tower conveyer. In this way any one or all of the main conveyer belts may be made to discharge on to the delivery belt of a tower or any one or all of the trippers may be lowered and passed from one tower to another.

My improvements are illustrated in the accompanying drawings, in which.

Figure 1:
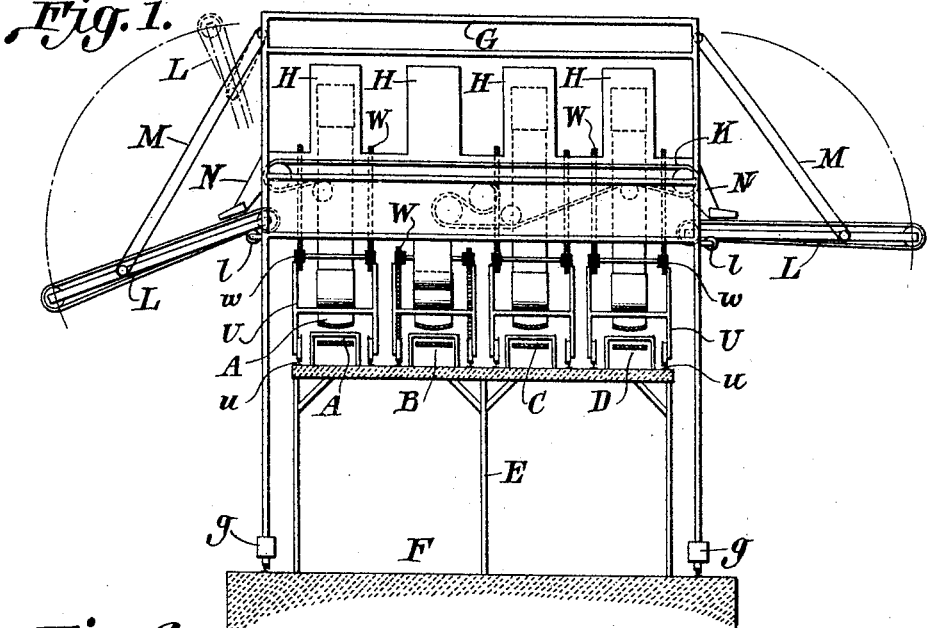
Figure 1 is a view in transverse section, showing four main conveyer belts associated with a tower provided with a transversely arranged delivery belt discharging on to boom conveyers on opposite sides of the tower.
Figure 2:
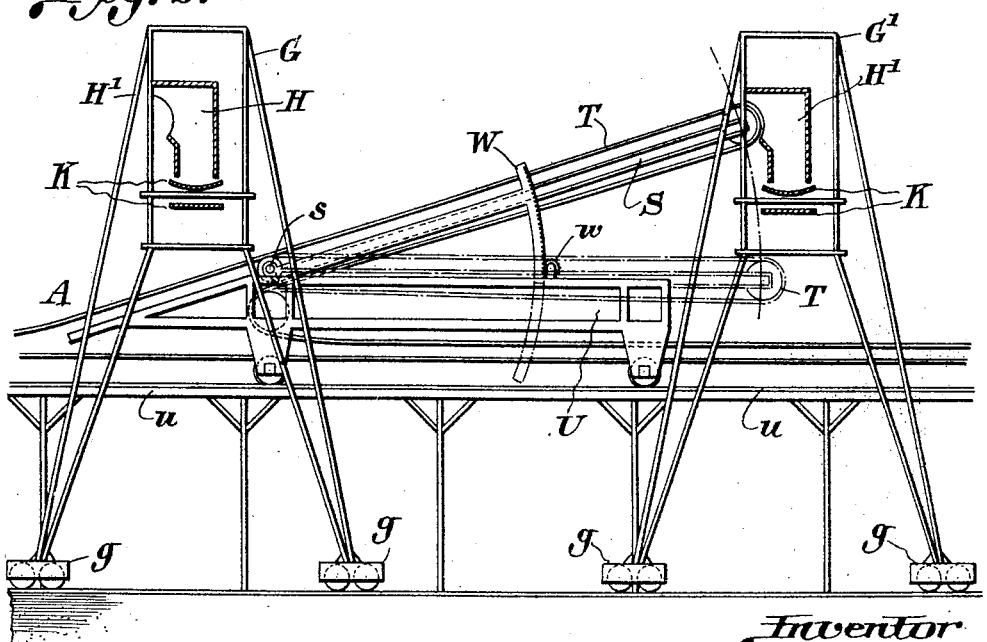
Figure 2 is a view in side elevation showing two towers associated with the main conveyer belts and showing how the trippers may be raised and lowered.

Four main conveyer belts A, B, C, D, are in this instance shown, but the number of belts may be increased or decreased. The belts carry the material from a source or sources of supply, such as car dumpers, storage piles, etc. In the embodiment of my invention shown in the drawings the main conveyer belts are disposed above a structure E, which holds them above the ground level F, but this is not essential.

Two towers, G, G′, are illustrated in the drawings and they are supported on trolleys *g* in such manner that they may be moved back and forth to any desired extent longitudinally of the main conveyer belts. Each tower comprises a frame H′, provided with a plurality of hoppers H, all delivering to a conveyer belt K, driven in any suitable way, and on each side of the tower there is a boom conveyer L pivoted at *l* to the tower frame and provided with tackle M by which it may be raised and lowered. Hoppers N are interposed between the belt K and the boom conveyers L. The belt K may be motor-driven in either direction so as to deliver to either of the boom conveyers and the belts of the boom conveyers may also be motor-driven. In fact, all movable mechanism may be motor-driven in well-known ways. The apparatus may be so operated that all the hoppers H may deliver to the belt K or any one of them may deliver thereto.

Each main conveyer belt is formed with a delivery loop or tripper T, adapted to discharge into a hopper H. Each loop T is supported by a frame S, pivoted at *s* to a truck U, supported on rails *u* on the elevated structure E. Each frame S is provided with one or more toothed segments W, operated by gearing *w* of any suitable kind and by means of which the delivery loops may be raised and lowered, as indicated by dotted lines. When a frame S is raised the tripper is in proper position to deliver to a hopper. When the frame S is lowered the tripper can pass through the tower below the delivery belt therein so that the tripper of any delivery belt may be withdrawn from any tower and shifted to another.

When the conveyers are organized and associated in this way the material can be conveyed from various sources of supply and delivered from any source to any tower located anywhere on a pier or other place of delivery and when it is desired to deliver material from any particular source of supply anywhere along the main conveyer belt the tripper can be shifted from one tower to another very quickly whenever desired.

I claim as my invention:—

1. A conveyer system comprising a main conveyer belt provided with a delivery loop or tripper, a traveling structure or tower movable longitudinally relatively to the belt, a delivery conveyer carried by the tower arranged cross-wise of the main conveyer belt, and means for raising and lowering the tripper to a position above the belt or to a position below it.

2. A conveyer system comprising a main conveyer belt provided with a delivery loop or tripper, a traveling structure or tower movable longitudinally relatively to the belt, a delivery conveyer carried by the tower arranged cross-wise of the main conveyer belt and adapted to move in either direction, a boom conveyer on each side of the tower adapted to receive material from the tower belt, and means for raising and lowering the tripper to a position above the belt or to a position below it.

3. A conveyer system comprising a main conveyer belt provided with a delivery loop, a frame supporting the loop, a truck to which the frame is pivotally connected, means for raising and lowering the frame, and a delivery conveyer associated with the delivery loop and receiving material therefrom.

4. A conveyer system comprising a main conveyer belt provided with a delivery loop or tripper, a traveling structure or tower movable lengthwise relatively to the belt, a delivery conveyer carried by the tower arranged cross-wise of the main conveyer belt, a truck mounted to move through the tower, and means carried by the truck for raising and lowering the tripper.

5. A conveyer system comprising a main conveyer belt provided with a delivery loop or tripper, a traveling structure or tower movable lengthwise relatively to the belt, a delivery conveyer carried by the tower arranged cross-wise of the main conveyer belt, a truck mounted to move through the tower below the delivery conveyer therein, a pivotal connection between the truck and the tripper, and means carried by the truck for raising and lowering the tripper to a position over the delivery conveyer carried by the tower and to a position below said conveyer.

6. A conveyer system comprising a plurality of main conveyer belts provided with delivery loops or trippers, a traveling structure or tower provided with a delivery conveyer movable in opposite directions, means for holding the trippers in delivery position whereby all may be delivered to the tower conveyer, and means for raising and lowering any one or all of the trippers to a position permitting them to be passed through said tower.

7. A conveyer system comprising a plurality of main conveyer belts provided with delivery loops or trippers, a plurality of traveling structures or towers each provided with a delivery belt arranged cross-wise of the main conveyer belts, a truck mounted to move through the towers, and means carried by the truck for raising and lowering the trippers to a position for delivering material to the tower conveyer or to a position below said conveyer whereby the tripper or trippers may be moved from one tower to another.

In testimony whereof I have hereunto subscribed my name.

FRANCIS LEE STUART.